(12) United States Patent
Barth

(10) Patent No.: US 11,888,647 B2
(45) Date of Patent: *Jan. 30, 2024

(54) SYSTEM AND METHOD FOR COLLECTING AND DISPLAYING INFORMATION ABOUT MANY COMPUTER SYSTEMS

(71) Applicant: Charles Schwab & Co., Inc., Westlake, TX (US)

(72) Inventor: Jonathan S. Barth, Leander, TX (US)

(73) Assignee: CHARLES SCHWAB & CO., INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/810,686

(22) Filed: Jul. 5, 2022

(65) Prior Publication Data

US 2022/0400030 A1    Dec. 15, 2022

Related U.S. Application Data

(63) Continuation of application No. 13/412,376, filed on Mar. 5, 2012, now Pat. No. 11,381,481, which is a continuation of application No. 12/386,730, filed on Apr. 21, 2009, now Pat. No. 8,131,842.

(60) Provisional application No. 61/207,482, filed on Feb. 11, 2009.

(51) Int. Cl.
*H04L 43/0817* (2022.01)
*H04L 43/0852* (2022.01)
*H04L 12/413* (2006.01)
*H04L 43/045* (2022.01)

(52) U.S. Cl.
CPC .......... *H04L 12/413* (2013.01); *H04L 43/045* (2013.01); *H04L 43/0817* (2013.01); *H04L 43/0852* (2013.01)

(58) Field of Classification Search
CPC . H04L 12/413; H04L 43/045; H04L 43/0817; H04L 43/0852
See application file for complete search history.

(56) References Cited

U.S. PATENT DOCUMENTS

| | | | | |
|---|---|---|---|---|
| 7,210,073 | B1* | 4/2007 | Landwehr | G06Q 10/06 714/47.2 |
| 7,933,988 | B2* | 4/2011 | Nasuto | G06F 11/3419 709/224 |
| 2002/0152304 | A1* | 10/2002 | Collazo | H04L 41/042 709/224 |
| 2005/0018611 | A1* | 1/2005 | Chan | H04L 43/0888 709/224 |
| 2006/0168240 | A1* | 7/2006 | Olshefski | H04L 69/163 709/227 |
| 2008/0184229 | A1* | 7/2008 | Rosu | G06F 9/5088 718/1 |

* cited by examiner

*Primary Examiner* — Jason D Recek

(74) *Attorney, Agent, or Firm* — Harness, Dickey & Pierce, P.L.C.

(57) ABSTRACT

A system, method and computer program product collects and provides for display operational status data in several levels of detail about multiple client computer systems.

18 Claims, 9 Drawing Sheets

FIG. 3

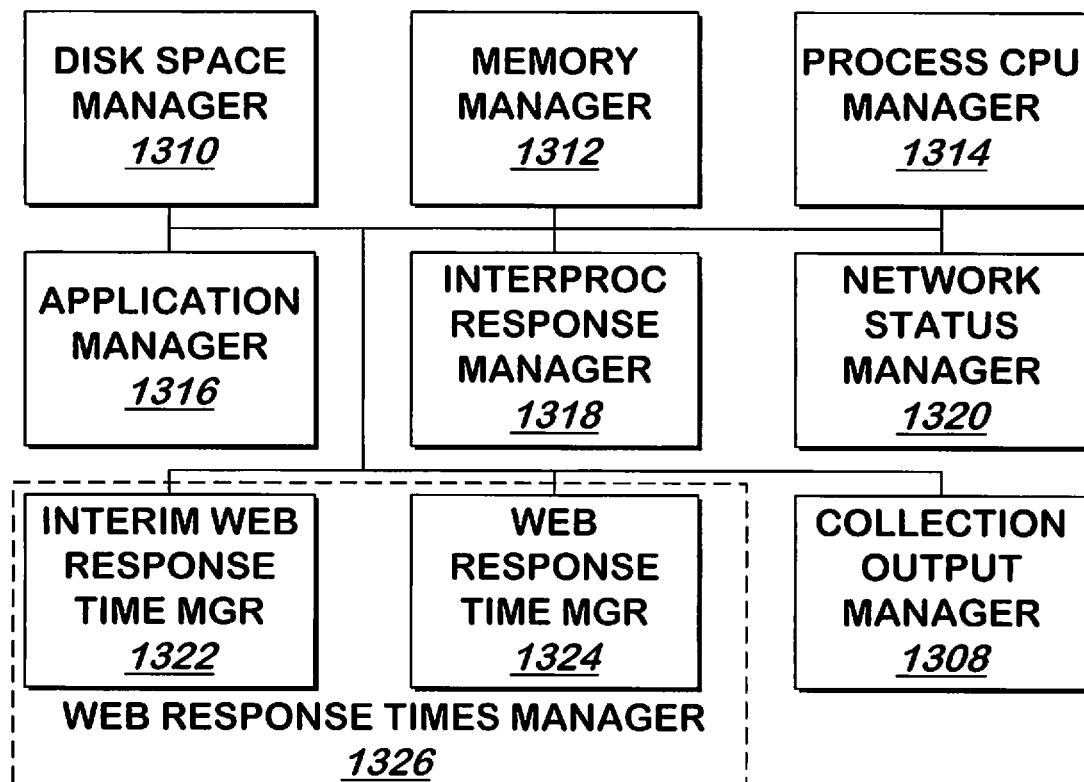
FIG. 13   1116 COLLECTION MANAGER
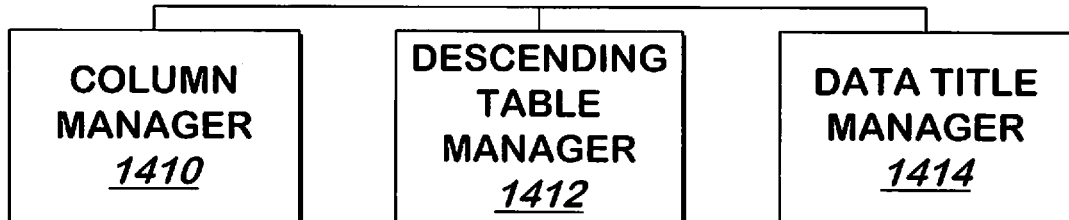
FIG. 14   1118 COLLECTED DATA PROCESSING MGR
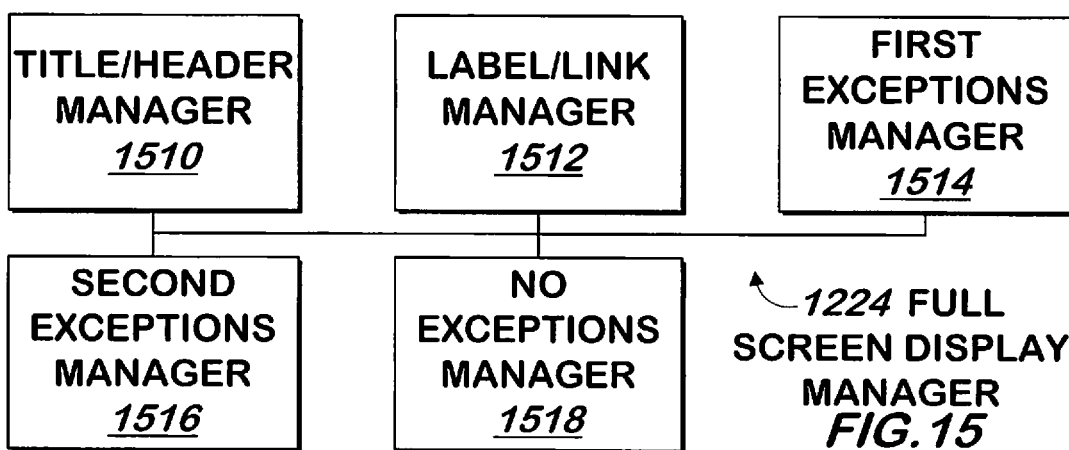
FIG. 15

SYSTEM AND METHOD FOR COLLECTING AND DISPLAYING INFORMATION ABOUT MANY COMPUTER SYSTEMS

RELATED APPLICATIONS

This application is a continuation of U.S. patent application Ser. No. 13/412,376 entitled, "System and Method for Collecting and Displaying Information About Many Computer Systems", filed on Mar. 5, 2012 by Jonathan Barth, which is a continuation of U.S. patent application Ser. No. 12/386,730 entitled, "System and Method for Collecting and Displaying Information About Many Computer Systems", filed on Apr. 21, 2009 by Jonathan Barth, which claimed the benefit of U.S. Provisional Patent Application Ser. No. 61/207,482, entitled, "System and Method for Collecting and Displaying Information About Many Computer Systems" filed by Jonathan Barth on Feb. 11, 2009, each having the same assignee as the present invention, and each is hereby incorporated by reference in its entirety.

FIELD OF THE INVENTION

The present invention is related to computer software and more specifically to computer software for computer system management.

BACKGROUND OF THE INVENTION

Some businesses run dozens or hundreds of computer systems. For example, companies may have dozens or hundreds of computer servers that each may be servicing dozens or hundreds of users. To monitor the status of smaller numbers of computer systems, an individual can switch among computer screens of each of the computer systems, querying for status as they switch among the screens, but to monitor dozens or hundreds of computer systems can require much more effort. Even if the effort is undertaken by many individuals, each watching multiple computer screens, the managers of a company may wish to have a way to allow them to monitor the status of a larger number of computer systems using much less time and effort.

It can be desirable to display information regarding the status of multiple computer systems, allowing for detailed information if desired, but without significantly impacting the performance of those computer systems to collect such data, and without requiring parties who wish to monitor multiple computer systems to sort through volumes of data. What is needed is a system and method for collecting and providing data regarding the status of multiple computer systems.

SUMMARY OF INVENTION

A system and method on a client computer system detects and reports to a server regarding status of the operation of computer programs running on that client computer system, network and internet status of the client computer system, and system level and other status of the client computer system, once per period of time, such as a minute. Detection and reporting is performed in accordance with a script or other document. Each client computer system having the same platform type and role type identifier uses the same script, which may be different from the scripts that other client computer systems having other platform types and role types use to report their status. Clients having the same role, but using different platforms may report at least similar information.

The script or other document specifies how to identify the class of a status data value or values. The class indicates whether the status data value or values are within a normal operating range, or in a different range. The client (or the server) identifies the class of the various status data values.

The server provides several views of the status information. In a full screen mode, the server allows a user to view exception status of all computers sharing the same role type based on the identified classes of the status data values, along with the name of the role or a set of roles for each of several roles or role sets. The name serves as a link to a more detailed report of the role or set of roles corresponding to the name.

If the user clicks on the name, additional detail is provided for display by the server and a lightweight application running on a display client computer system the user can use to display status information. The detail includes the status data values for each client computer system of the role type or types corresponding to the clicked name, color coded according to the class of the status data value. If the user hovers the mouse cursor over one of these status data values, the lightweight application running on the display client retrieves from the server additional detail that may have been provided by the client computer system, particularly if the class of the status data value over which the user hovered the mouse cursor indicated that the status data value was not in a normal operating range.

The status data values are displayed for the immediately preceding prior period of time in a real time mode of the display. The user can indicate a different period of time, and the status data values are displayed for the desired period of time, along with a date and time corresponding to the period of time, in a replay mode of the display. The views of the status data values are customizable by the user, to allow some users to see some data in one order and orientation, and other users to see different data in a different order and orientation.

The user can update the script for a platform type and role type and indicate to the server that the clients of that platform type and role type should use the new script. When the clients report the status data values to the server, the server will respond, in accordance with the platform type and role type, that the client should download a new script, and the clients will comply, updating the scripts within one period of time, thereby synchronizing the client computer systems of a platform type and role type to use the new script within one period of time.

BRIEF DESCRIPTION OF THE DRAWINGS

FIG. 13 is a block schematic diagram illustrating a collection manager of FIG. 11 in more detail according to one embodiment of the present invention.

FIG. 14 is a block schematic diagram illustrating a collected data processing manager of FIG. 11 in more detail according to one embodiment of the present invention.

FIG. 15 is a block schematic diagram illustrating a full screen display manager of FIG. 12 in more detail according to one embodiment of the present invention.

DETAILED DESCRIPTION OF A PREFERRED EMBODIMENT

Figure 1:
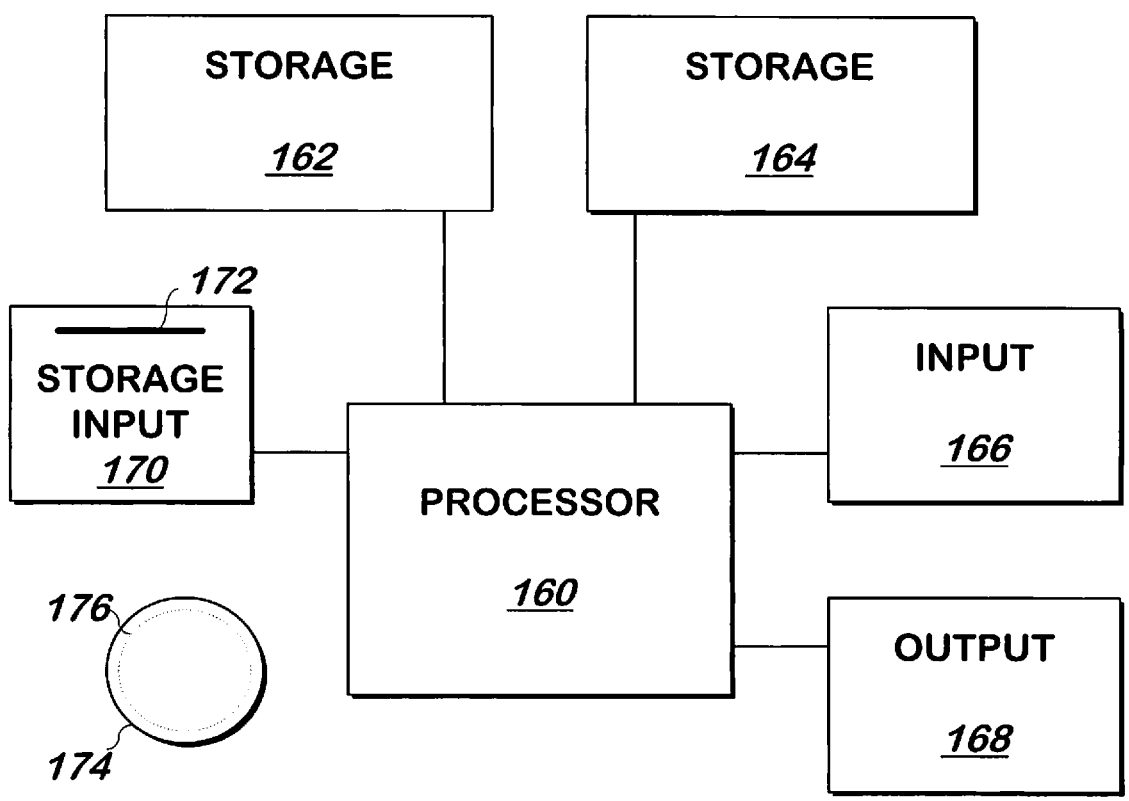
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, California, a PENTIUM-compatible personal computer system such as are available from DELL COMPUTER CORPORATION of Round Rock, Texas running a version of the WINDOWS operating system (such as 95, 98, Me, XP, NT or 2000) commercially available from MICROSOFT Corporation of Redmond Washington or a Macintosh computer system running the MACOS or OPENSTEP operating system commercially available from APPLE INCORPORATED of Cupertino, California and the FIREFOX browser commercially available from the MOZILLA FOUNDATION of Mountain View, California or INTERNET EXPLORER browser commercially available from MICROSOFT above, although other systems may be used.

Client Script Operation and Reporting

Figures 2, 3:
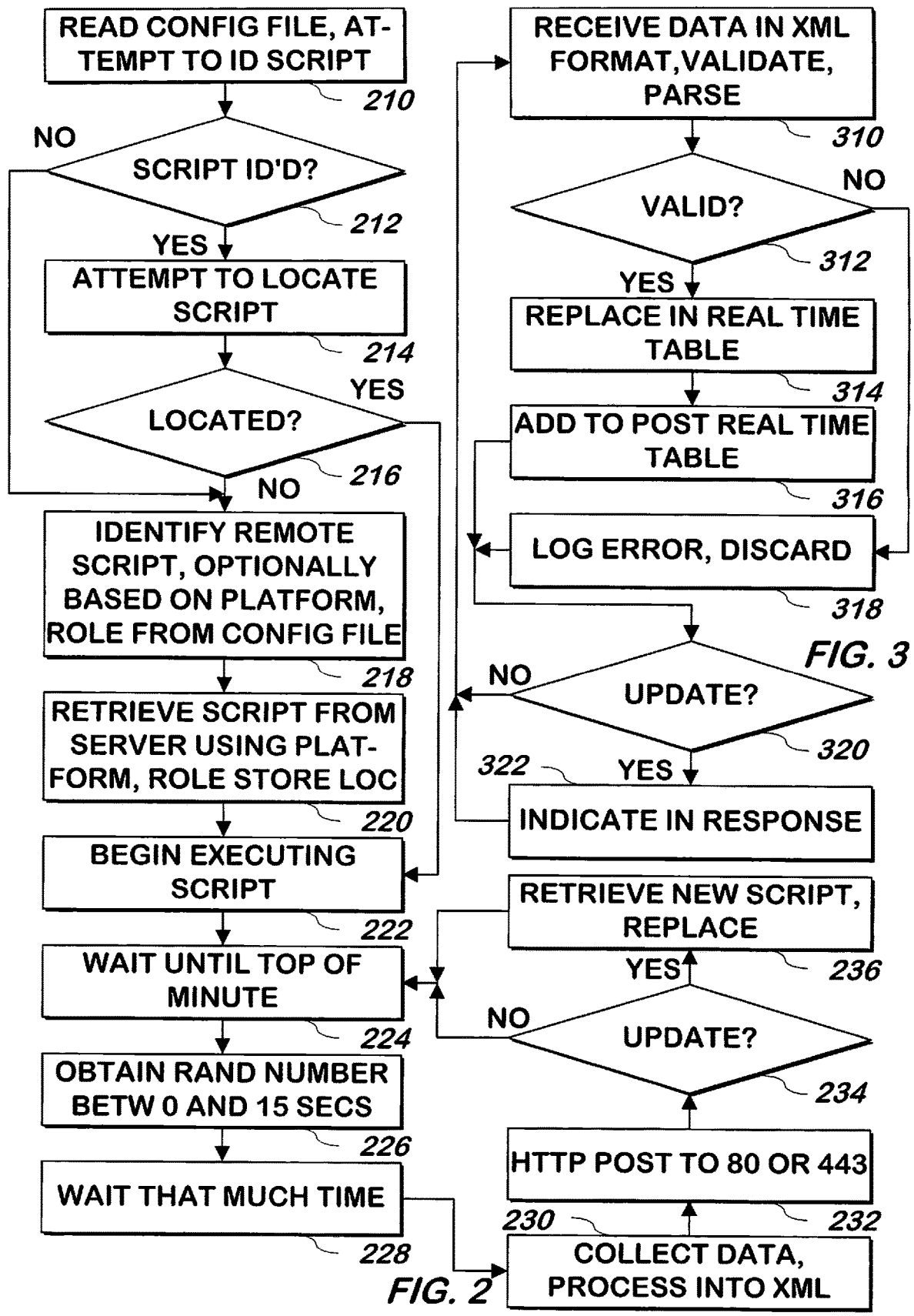
FIG. 2 is a flowchart illustrating a method of collecting and providing to a server data about a client computer system according to one embodiment of the present invention.
FIG. 3 is a flowchart illustrating a method of receiving at a server data about client computer systems according to one embodiment of the present invention.

Referring now to FIG. 2, a method of reporting data from a client to a server is shown according to one embodiment of the present invention. The client and server are different computer systems. In one embodiment, each of several clients will perform the steps of FIG. 2. In one embodiment, each client has been assigned one of several platform and role identifiers in a configuration file that is stored on the client. In one embodiment, the platform identifier can include the operating system the client runs. In one embodiment, the role identifier is assigned based on a primary computer program that the client computer system runs. One or more functions the client serves is used to determine the "role" of the client.

In one embodiment, some or all of the client computer systems are themselves servers, such as conventional web servers. For the purpose of reporting information, such computer systems are "clients", but there is nothing that prevents a client described herein from operating as a server to other client computer systems to which it communicates.

At system startup or at any other triggering event, the client reads 210 the configuration file. The configuration file may identify the location of a script to be executed, the script being located on the client or on a different computer system. If the location of the script can be identified 212, an attempt is made 214 to locate the script at that location.

If the script is found at that location 216, the method continues at step 222. If the script is not found at the location specified in the configuration file 216, a location of a remote script for the role and platform identifiers in the configuration file is identified 218 using an internally stored table of locations and platform/role combinations, and a script is retrieved from that location and stored on the client 220. The remote script may be located on a computer system other than the client or may be located on the client. The method continues at step 222.

If the location of the script can not be ascertained from the configuration file 212, the method continues at step 218.

At step 222, the script begins executing. As instructed in the script, the script waits 224 until the top of the minute as specified by its own internal system clock, which may be synchronized with clocks in other client systems of the same and/or different roles. Each minute corresponds to an "epoch", though other embodiments use other durations of epochs. The script obtains 226 a pseudo random or random number that indicates (after an optional conversion) between one and fifteen seconds. The script then waits 228 until that much time has elapsed on the system clock, and then the script collects data as described in more detail below and processes the collected data as described in more detail below into an XML or other self describing format or any other format 230. The script provides, via a network such as a local area network, the Internet, or both, the data, an identifier of the role (and optionally, the platform), a unique identifier of the client (e.g. its MAC address or IP address), and the current date and time to a server having an address specified in the script, for example using an HTTP post to port 80 or 443 232.

In one embodiment, the server may provide a response to the data that indicates that the client should obtain a new script from the server as described in more detail below. If such a response is received 234, the client will retrieve from the server the new script and replace the script it has with the newly-retrieved script 236, using the newly received script from that point until a newer script is received as described herein. The method continues at step 224. If such a response is not received 234, the method continues at step 224.

Thus, the data corresponding to the immediately preceding epoch is updated and provided to the server after the start of each epoch and this process is repeated again and again for each epoch.

Data Storage at the Server.

Referring now to FIG. 3, a method of storing on a server, data received as described in FIG. 2, is shown according to one embodiment of the present invention.

Data is received, for example, in XML format, and the received data is parsed and the parsed data is validated to ensure that it is correctly formatted and the required terms are supplied 310.

In one embodiment, valid, received data is added into two tables, a real time table that only holds the most currently received data (i.e. newly received data replaces existing data for a client), and a post-real time table that holds both the current data, as well as older data. If the received data is valid 312, the received data (and the time received with the data) is used to replace 314 any previously stored corresponding data from the same client in a portion of the real time table that holds that data from that client and is added 316, along with the identifier of the client and the date and time, to the post real time table, and the method continues at step 310. In one embodiment, a stored procedure in a database operates to perform steps 314 and 316, and may perform some or all of the other steps of FIG. 3 as well.

If the received data is not valid 312, the error is logged, with an identifier of the client and the date and time, the data is discarded 318, and the method continues at step 310.

As described in more detail below, a management mode may be used to update a script for a platform and role on the server and indicate that the script for that platform and role should be used by clients of that platform and role. If such an indication has been received for the platform and role corresponding to the data just received (the platform and/or role may be specified as part of the data) 320, an indication is provided 322, as part of the response, to retrieve the script from the server and the method continues at step 310 and otherwise 320, the method continues at step 310.

Representative Detail of Data Collection at the Client.

As noted above, the script on the client collects data from the client. There are many types of data that the designer of each script may wish to collect. Typically, the designer of the script for a given role will design a script to collect data that shows the services that will impact the performance or operation of one or more programs on the role corresponding to that client. The scripts for each role may be tailored for each platform that may support the role, based on differences for each platform.

Figure 4:
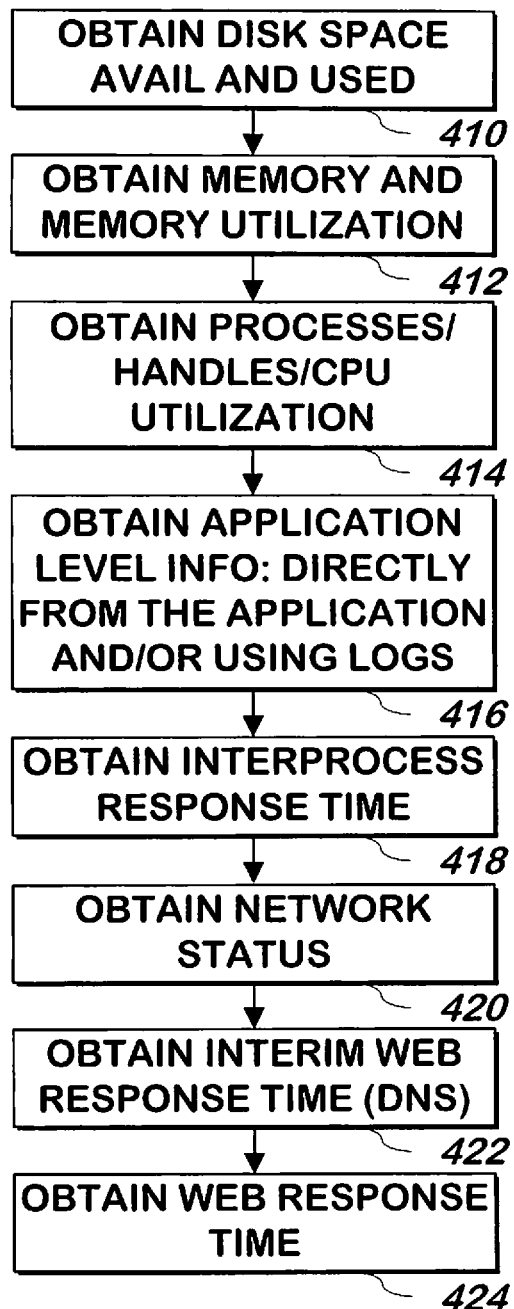
FIG. 4 is a flowchart illustrating a method of collecting data about a client computer system according to one embodiment of the present invention.

Referring now to FIG. 4, a method of collecting data about a client and its environment is shown according to one embodiment of the present invention. Some or all of the steps below may be used to collect data about the client and its environment. The currently available disk space and the disk space currently used are retrieved 410, for example, via a call to an operating system. In one embodiment, the total disk capacity may be retrieved in place of either one of these items.

The available memory and utilized memory (or one of them and the free memory) are obtained 412, for example, from the operating system of the client. For example, one can cat the proc free memory dir on LINUX to obtain free memory.

The names and number of processes running on the client (as well as the remainder, such as a system idle process) and the percent of CPU utilization of each process and of the client itself is obtained 414 from operating system of the client. For example, the names of, and percentage of CPU used by, each process may be obtained using the process PS on LINUX or from the process tree on WINDOWS, and the percentage of the CPU used by the client may be obtained using SAR on LINUX or from the perf counters or WMI on WINDOWS. The use of existing information allows the system and method of the present invention to be minimally intrusive by not creating effects on the client computer system that will itself interfere with the operation of the client computer system. Although such minimal intrusion may not be possible to obtain all data as described herein, in one embodiment, it may be used to the extent possible.

In one embodiment, scripts for different roles that utilize the same platform may share much of the above techniques for obtaining system level information where obtaining such information can be performed in the same manner.

Application level information is obtained for each of the one or more applications that are to be monitored on the client 416. In one embodiment, an application is monitored if it impacts a service that is provided to one or more users by the role. In one embodiment, application level data may be obtained directly from some or all of the monitored applications, and/or may be obtained indirectly from one or more other applications that monitor any such applications.

In one embodiment, to directly obtain application level information, for each monitored application on the client, a connection is made to a port or socket that the application can use to communicate, a string that contains a command that the application understands, is passed over the port or socket, and a response is received over that same socket or port or a different socket or port. The response time of the application is measured as the difference in time between the sending of the string and receipt of the response.

In one embodiment, a computer system separate from the one on which the application runs sends a request to the application, for example via the Internet, and measures the response time. The computer system uses the method described herein to run a script that performs such monitoring operation, and provides the data as described herein, using the client name and identifier of the client computer system being monitored. The server stores the data from this additional source and from the computer system being monitored as if it came from the same source, matching the epoch from the timestamp of each source to complete the data that the other source does not provide. Data from any number of sources may be assembled in this fashion.

To indirectly obtain application level data for the monitored applications on each client serving that role, application specific APACHE or WEBSPHERE information is retrieved from logs or from those programs themselves during the full minute preceding the current minute, though other periods (corresponding to the reporting period) may be used. If such information is not timestamped, it may be retrieved at the end of the epoch and compared with the retrieval at the end of the prior epoch, for example (obtaining it at the beginning and end if there was no prior epoch). The new information is considered to have occurred during the immediately preceding epoch. Such immediately preceding epoch information may be the information provided as described herein.

Interprocess response times are obtained 418. To obtain interprocess response times, a process may be started on the client that makes requests to a different process on the client and reports the amount of time between the time the request is sent and a time a response is received. The different process may be a process that is started to respond to such requests, or it may be a process that runs on the client that serves the given role for other purposes as well.

Network status is obtained 420, for example using a cat to the proc dir NETTCP on Linux.

Interim web response times for the client are obtained 422. In one embodiment, to obtain interim web response times, a request is made from the client to a URL that uses a domain name rather than the IP address, and the DNS response is observed. The time between the request and the DNS response is identified as the interim web response time for the client.

The web response time is obtained from the client 424. In one embodiment, to obtain the web response time, the request above may be used or a different request may be used. The request used for this purpose is made to one or more services over the web that are used by the client, to a service provided by the client (e.g. using the IP address of the same client from which the request is generated), or both, and the time between the request and the response is measured, for example by obtaining the two times from an operating system and calculating the difference. Thus, the client may not only test the response time of the services provided by other computer systems that it uses, but may also test its own response time as well.

Processing Data at the Client.

Figure 5:
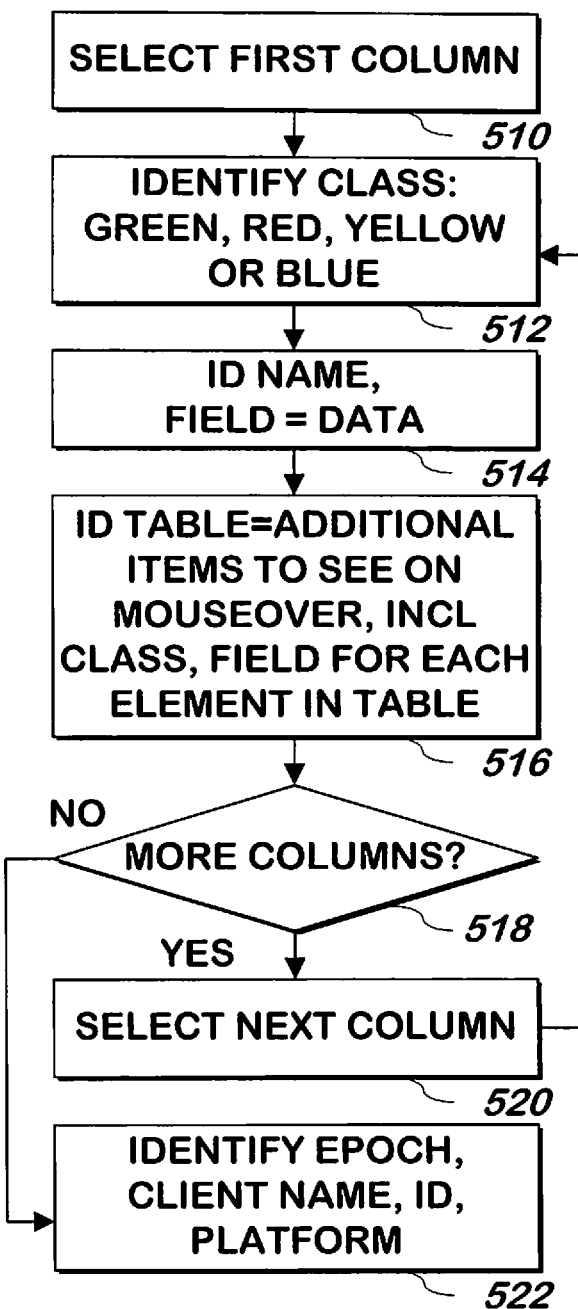
FIG. 5 is a flowchart illustrating a method of processing collected data about a client computer system according to one embodiment of the present invention.

Referring now to FIG. 5, a method of processing data is shown according to one embodiment of the present invention. The method of FIG. 5 may be used to process the data of FIG. 4. In one embodiment, data is provided from a client to a server as one or more hierarchical tables. Each table may have one row, but that row may be assembled at the server as a table with multiple rows, each row corresponding to a different epoch (i.e. period of time).

A first data column of the table to be provided from the client to the server is selected 510. A data column refers to the data that will be added to a column in the database, and may represent any status information, such as percentage of CPU, response time and the like. In one embodiment, data columns, also referred to as 'columns' have a one to one correspondence with the collected status data. That is, each piece of collected status data corresponds to its own column. In another embodiment, two or more of the different status data elements collected may be used to calculate each of one or more scores, and the corresponding column corresponds to a score.

The class of the column is identified 512. In one embodiment, the class of the column corresponds to either the degree to which the column indicates that the performance of the client is being impacted, or the degree of change since the last class was identified. For example, a column may have a class of green, yellow, red or blue. The class is identified based on the value of the data in the identified column and thresholds for each class and/or formulas that are in the script. If the value of the data in the identified column is consistent with optimal operation, slightly suboptimal operation or more than slightly suboptimal operation, the class is identified as green, yellow, or red, respectively. The thresholds for green and red may be determined by watching operation of each client and then adjusting the thresholds as normal operation data values and significant problem operation data values, and then using yellow as anything in between the normal operation field values and significant problem operation field values. Other techniques may be used to identify the thresholds.

In one embodiment, the prior epoch class for each column is retained, and once the class is identified as described above, the identified class is compared with the prior class for the column. If they are different, the class is identified as blue. In one embodiment, only if the class is different in a certain direction or by a certain amount or both is the class for the column assigned as blue.

Thus, the class is identified responsive to a document, namely, a portion of the script, that also causes the data values to be obtained and sent. In other embodiments, the class is identified at the server using a copy of same or all of the script.

The name of the column is identified and the value of the data corresponding to the column is identified as its "field" or data value 514. For example, the data value corresponding to the memory utilization column is the percent utilization or percent free identified as described above. Each such data value corresponds to a status indicator, such as memory utilization, and status indicators may indicate status of an application on the client or status of a system resource, such as memory, of the client.

In one embodiment, some or all of each of the columns have a table considered to descend from that column of the table. The descending table includes one or more columns of additional data that may be normally hidden, but can be viewed when the user wishes to view the additional data. The columns of each such table are built in the same or similar manner as the columns described herein. In this manner, the columns make up a table, and tables are hierarchical, descending from a column of a table. There may be any number of levels in the hierarchy, with tables descending from a column of a table that itself descends from still other columns of a table. A descending table may provide additional detail about the data value in a column, or it may assist in understanding a problem that may have led to the data value being outside of its normal range.

In one embodiment, tables descending from a column are only identified if the class of the column is other than green. This allows a user at the server to drill down on a column having an exceptional class, while minimizing the data sent to the server for columns that have a green class.

If there are more columns 518, the next column is selected 520 and the method continues at step 512 using the newly selected column. If there are no more columns 518, the epoch (which is an indication of the current time period, such as the minute that the script building the tables started at the top of as described above), client name or other identifier (which may be an IP address, MAC address or other name unique among the clients of the same platform or among all clients, and the name of the role and/or platform corresponding to the client are identified 522.

The table (including descendant tables) and the information of step 522 are the information sent to the server by the client as described above. Each client of the same role collects and sends the same type of table, using fields and classes that correspond to the role of that client, and clients of different roles may send the same or similar type tables as other roles or they may send entirely different tables. There may be multiple clients that make up the same role, and there may be multiple roles. Within each role there may be one type of platform or more than one type of platform.

It is noted that each script may be different for each role and/or platform. The field names and values to report are those that can provide clues to problems or potential problems for clients serving that role, and for clients providing that platform. Some fields may be the same for many scripts, but the class thresholds or calculations may be different for each role and/or platform. In one embodiment, some or all of the application information for different platforms that share the same role or roles, but use different operating systems, may be the same and thresholds may be the same as well.

Providing Data by the Server for Display.

Figure 6:
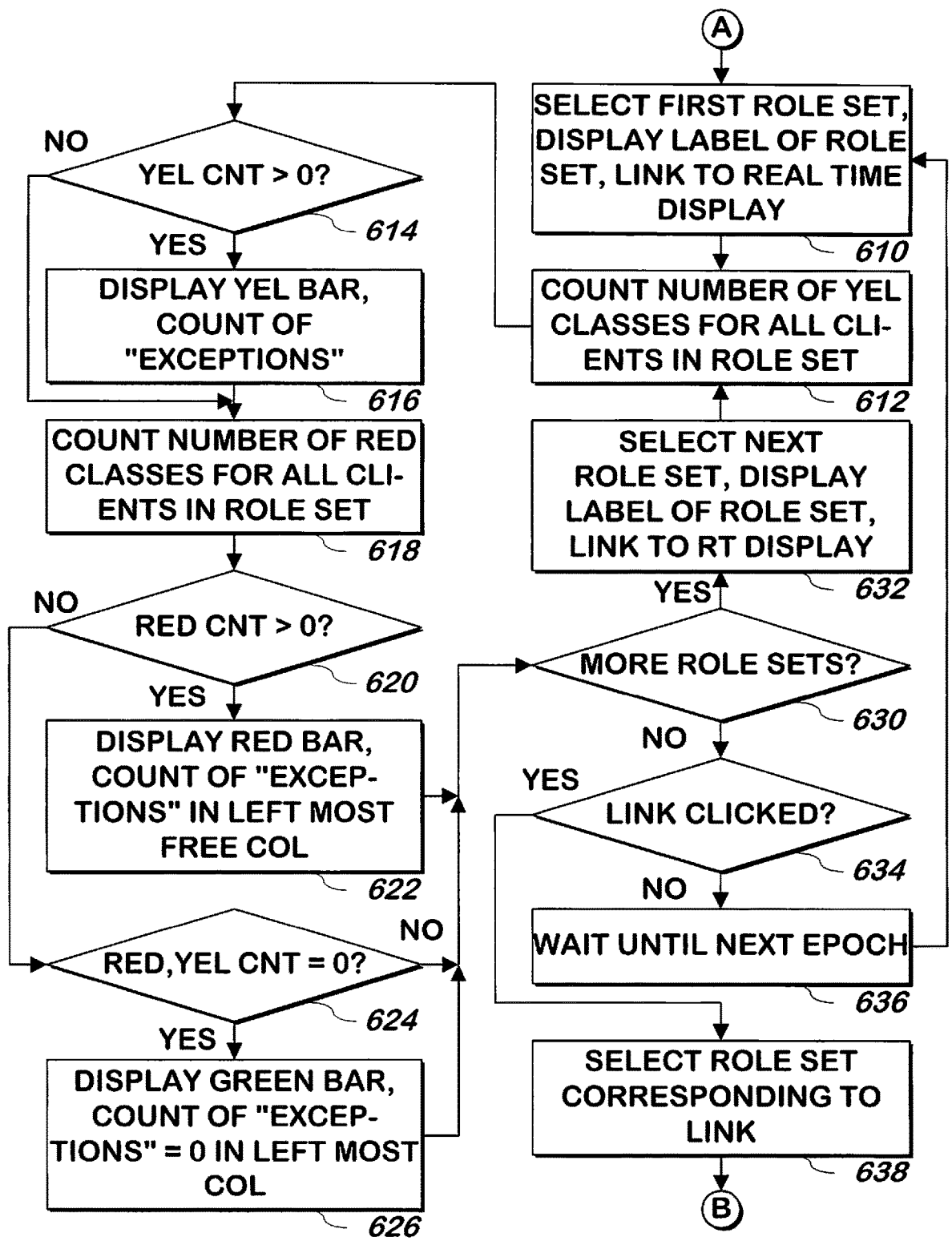
FIG. 6 is a flowchart illustrating a method of providing for display data about multiple sets of one or more roles, each having multiple client computer systems according to one embodiment of the present invention.
Figure 7:
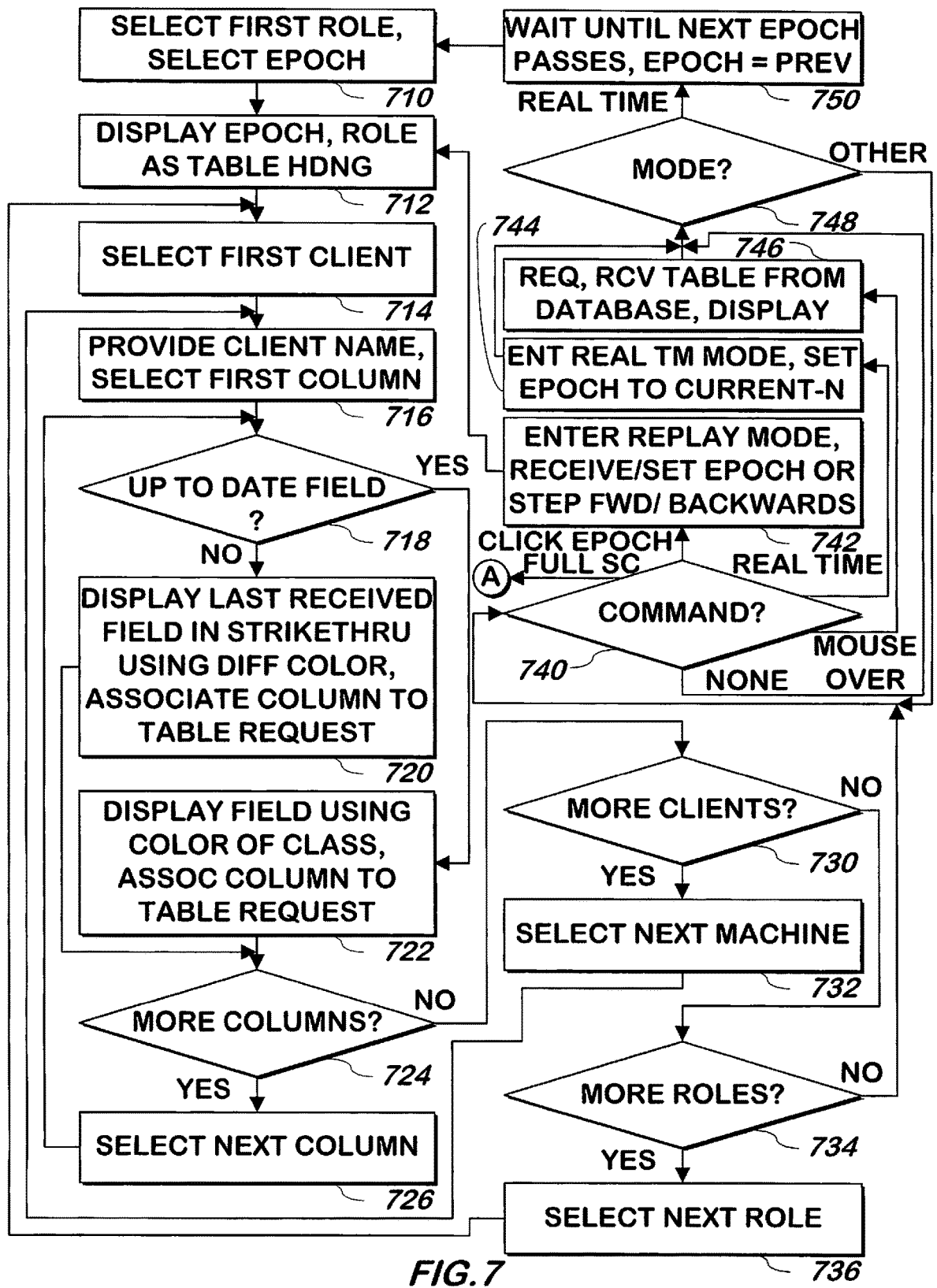
FIG. 7 is a flowchart illustrating a method of providing for display data about a set of one or more roles, each having multiple client computer systems according to one embodiment of the present invention.

Referring now to FIGS. 6 and 7, a method of providing data for display is shown according to one embodiment of the present invention.

In one embodiment, the display of information is performed using three primary modes, though there may be other modes. One mode is a full screen display, which displays status information for several roles or all roles, on one page. Should a user wish to view more detail on a set of one or more roles, the user may click on a link on the full screen page corresponding to the set of one or more roles the user wishes to view, and may then see detail on that set of one or more roles in a real time mode or a replay mode, described with respect to FIG. 7.

FIG. 6 illustrates the display of status data full screen mode. A first role set is selected and a label (e.g. a name) of the role set is displayed as a link that will cause the display in real time mode of the status data from the clients whose roles correspond to the role set. In one embodiment, each role set has one role, and the name of the role set is the name of the role that has been received from any client computer system that has identified itself as being an instance of that role as described herein and above. In another embodiment, more than one role may be grouped into a set of multiple roles, and such role set is provided with a name, for example, by a system administrator or user.

The number of yellow classes received as part of the data for all clients identifying themselves as instances of the selected role set are counted in the real time table 612. If the server identifies the class, the numbers used are those identified by the server. In one embodiment, the count is limited to the top level table that does not descend from another field. Thus, the count will not include classes columns that may descend from another column as described herein, and in another embodiment, all columns having a yellow class are counted. If the count of yellow classes is greater than zero 614, a yellow bar is displayed adjacent to (e.g. to the right of) the identifier of the role set and in the yellow bar is displayed 616 the count of step 612 as a count of exceptions and the method continues at step 618. If the count of yellow classes is zero 614, the method continues at step 618.

At step 618, the number of red classes is counted in the real time table for all client computer systems that identified themselves as being an instance of the role or roles corresponding to the role set. The count may be limited to top level tables or may include tables from all levels in the hierarchy, similar to that described for yellow classes above. If the count of red classes for the role set is greater than zero 620, a red bar is displayed 622 along with the count, as a count of exceptions either adjacent to the role set identifier if there is no yellow bar displayed for the selected role set, or adjacent to the yellow bar if there is a yellow bar displayed for the selected role set, and the method continues at step 630. If the count of red classes for the role set is zero 620, the method continues at step 624.

At step 624, if the count of red and yellow classes above are zero, a green bar with the message "0 exceptions" is displayed adjacent to the identifier of the role set 626 and the method continues at step 630, and otherwise, the method continues at step 630.

At step 630, if there are more role sets, the next role set is selected, and the identifier of the selected role set is displayed under the identifier of the previous role set as part of a link to the real time display of the status data for that role set 632, and the method continues at step 612 using the newly selected role set.

If there are no more role sets 630, if a user has clicked on one of the links 634, the role set corresponding to the clicked link is selected 636 and the method continues at step 710 of FIG. 7 using the role set corresponding to the clicked link.

If no link was clicked 636, a period of time equal to an epoch is allowed to elapse 638 and the method continues at step 610. Thus, the full screen view may be updated once per epoch, using the most recently received status information for all clients.

FIG. 7 illustrates a method of displaying status data and class information using both the real time modes and replay modes according to one embodiment of the present invention. The real time mode shows data from a set of one or more roles, with each role being displayed as a table, the table having either rows or columns that correspond to different clients that identified themselves as being of that role. In the real time mode, data is provided for display from the real time table. In the replay mode, data is provided for display from all but the most recent row for each client in the real time table.

A first role name is selected from the role set, and an epoch is selected 710. In one embodiment, before any epoch is identified, the epoch selected is the epoch that precedes by one the most recent epoch received from any of the selected roles. Otherwise, the epoch identified as described below is selected. As noted, the epoch indicates a period of time, such as the minute, to which data that will be displayed, corresponds.

The role identifier and epoch are provided for display 712, for example, by providing the epoch at the top of the screen and providing the role identifier as the heading of a table. In one embodiment, the information provided for display is provided by a server in response to requests made by display clients. The display clients may make such requests once for each epoch, though other ratios of epochs to requests may be made. In another embodiment, the server actively updates the display as described herein. Both embodiments may be supported by the same server in another embodiment.

A first client of the selected role is selected 714. The identifier of the selected client is provided for display, for example, as the first column in the first unused row of the table, and the first column for the selected client is selected 716.

In one embodiment, a convention may be used for the default ordering of the display of the columns, subject to being overridden by a user. In one embodiment, the convention is to display system level data for the client computer system in the leftmost columns, network and connection data in the rightmost columns, and application and service data in between these other two types of data. In this manner, the type of problem with a client computer system may be identified merely by looking at where the exception is indicated, as displayed by the class for the data.

If up to date data has not been received for the selected column of the selected client 718, the last received field for that client and that column is displayed (from the post real time table) in a color other than the color such field would be displayed if it were up to date as described in more detail below, and using strikethrough text, in the first unused column of the row in which the client name was displayed 720. Data is up to date if it has been received for the selected epoch. Thus, if such field is not received, for example, because the client is no longer providing it, the last received field value will be redisplayed for that column, which may itself provide clues as to why the client is no longer providing it. However, it is displayed differently than up to date data, to allow it to be differentiated from up to date data for that column.

In one embodiment, when the most recent data for a field is very out of date data (e.g. more than a day old), it is displayed as a blank field, and assigned a red class to cause a machine that last reported a yellow class to be viewed in all modes described herein as having red classes for data that has not been sent in a long time. Otherwise 718, the field value is provided for display 722 using the color of the class of that field.

If there are more columns for the selected client 724, the next column for the selected client is selected 726 and the method continues at step 718. If there are no more columns for the selected client 724, the method continues at step 730 using the newly selected column.

At step 730, if there are more clients, the next client of the selected role is selected 732 and the method continues at step 716 using the newly selected machine. If there are no more clients 730, if there are more roles in the role set 734, the next role is selected 736 and the method continues at step 714 using the newly selected role. If there are no more roles 734, the method continues at step 740.

At step 740, a user may optionally provide a command, for example by hovering a mouse over a field in the table or clicking on one of several epoch buttons described below. If a user of the displayed information hovers a mouse over a field in a column or otherwise expresses an interest in seeing additional data for a field, the descendant table for that field is requested from the database and provided for display (in one embodiment, everything provided for display is also displayed) 746. The method continues at step 748.

If the user clicks an epoch button 740, a replay mode is entered. In one embodiment, there may be several epoch buttons. One or more buttons may step the epoch backwards from the current epoch by a set amount, while another button allows the user to specify the epoch desired. When any such button is pressed, the user enters a replay mode, which sets the epoch according to the button pressed (and optionally, a specified epoch), and holds it there, allowing the user to change the epoch manually. If the user command is to click one of these buttons 740, the epoch is set to the indicated epoch and the replay mode is indicated 742 and the method continues at step 712 using the newly set epoch, or, if the user clicks the button to exit the replay mode and return to a real time mode 740, the replay mode is exited, the epoch is set to the epoch preceding the current epoch 744 and the method continues at step 748. If the user provides no command 740, the method continues at step 748. As noted data will be provided for display in the replay mode only from the data corresponding to that epoch in the post real time table.

At step 748, if the current mode is the real time mode (which is the default mode until the replay mode is selected), the method waits until the next epoch, at which point the selected epoch will be the immediately preceding epoch 750 and the method continues at step 710 using that epoch. If the current mode is the replay mode 748, the method continues at step 740.

Another command is to change the mode of the display to full screen mode. In full screen mode, status for several sets of one or more roles may be viewed as described above. If the command is a command to change to full screen mode 740, the method continues at step 610 of FIG. 6.

Figure 8:
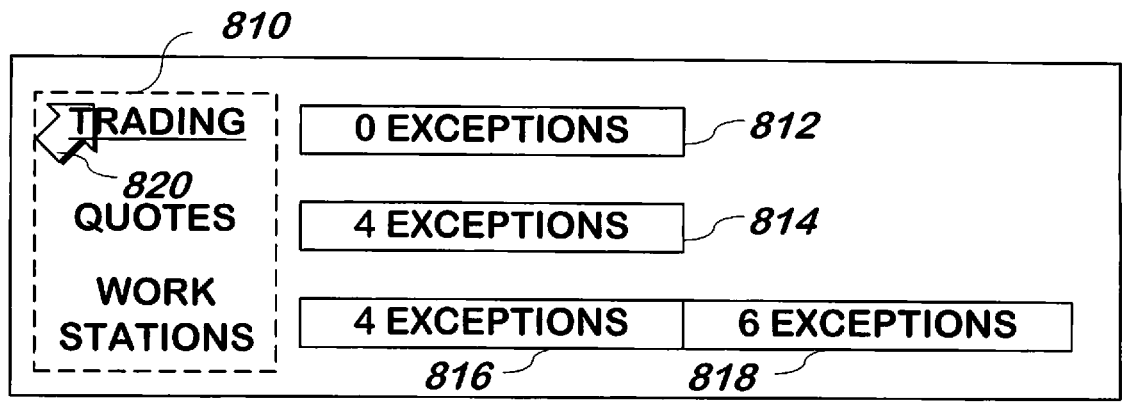
FIG. 8 is a representative screen display of a full screen mode display of status data for three role groups according to one embodiment of the present invention.

FIG. 8 is a screen view of a display of information in full screen mode according to one embodiment of the present invention. Role set identifiers 810 are displayed next to bars 812-818 that correspond to status of the role set as described above. Bar 812 is displayed in green and indicates that the role set "Trading" has no yellow or red classes in the current epoch as described above. Bar 814 is displayed in red and indicates that there are four classes reported as red (and zero in yellow) in the current epoch for the role set, "Quotes". Bars 816 and 818 are displayed in yellow and red, respectively, and indicate that there are four classes reported as yellow and six reported as red in the current epoch for the "Workstations" role set. As described above, the identifiers 810 are individually operable as links to view a real time mode display for the role set corresponding to a link that is clicked.

As the user hovers a mouse cursor 820 over the identifier for the role set, "trading", the identifier may be underlined indicating that the identifier is a link that can be clicked.

Figure 9:
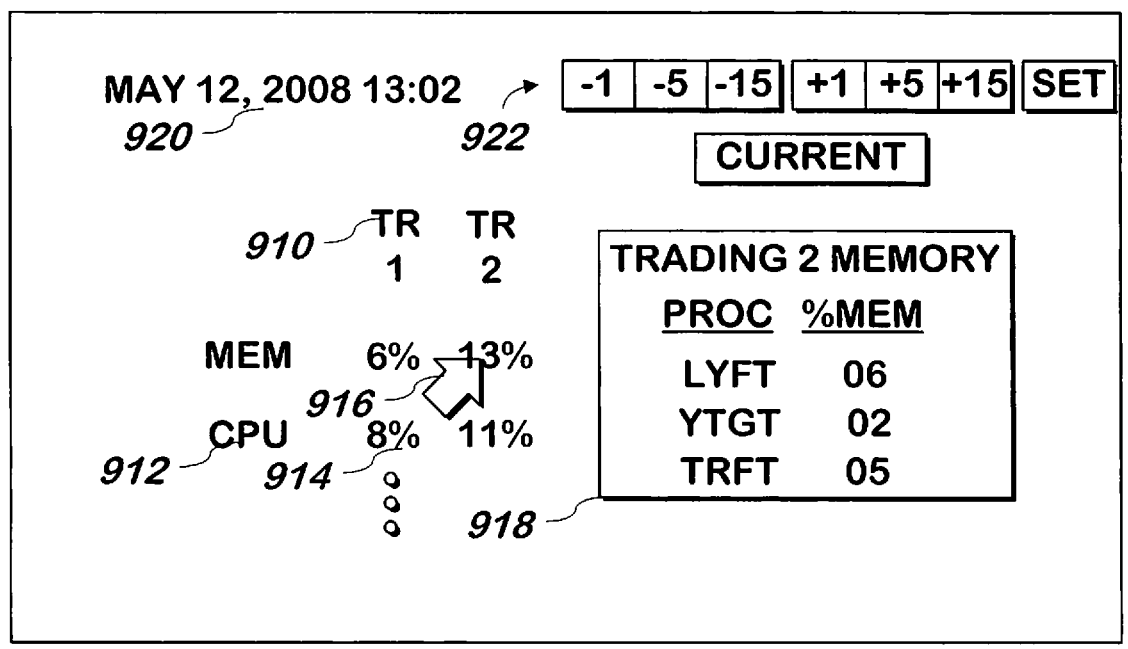
FIG. 9 is a representative screen display of a real time mode and/or replay mode display of status data for a role group having one role according to one embodiment of the present invention.

If the user clicks the link, the information for the trading role set is displayed in real time mode. Referring now to FIG. 9, a screen view of information in real time mode is shown according to one embodiment of the present invention. If the user clicked on the trading link, the top level fields for the trading role set (consisting of one role here: if there had been others, each role would be displayed in its own table on the same page) for each of two client computer systems TR1 and TR2 are shown. The names of the client computer systems are displayed, such as TR1 910.

In this case, memory utilization and CPU utilization are shown, but other fields may be shown beneath these as indicated by the ellipses. TR1 reported 6% and 8%, and TR2 reported 13% and 11%, for memory and CPU, respectively. The numbers are displayed in a column in the table, such as 8% 914 in the table element corresponding to TR1 CPU.

In one embodiment, each user may change the orientation of the table (i.e. displaying client computer systems as rows or columns), the order of the field values and whether or not to display them, and other parameters to suit their tastes or needs. Summary data such as sums, averages and the like may also be added to the end of each row or column that represents a field, and the values of such summary information for such field are calculated and displayed. Such customization may be accomplished via a command that allows the user to enter a management mode. In one embodiment, the management mode additionally allows editing of the scripts, customized for each role, used by each client computer. In one embodiment, a user may edit a script, and then indicate that the script for the corresponding role and platform should be replaced as described herein, and clients of that role on that platform will retrieve the script and use that script until that one is replaced as described above.

In one embodiment, data values may be provided in a time series graph, plotted minute by minute or using other time periods. The data values may be for a single client system or a sum or average of all client systems of a particular platform, role or both, allowing, for example, average memory usage for all clients of a particular role over every minute of the day to be plotted.

In FIG. 9, the user has hovered the mouse cursor 916 over the TR2 memory, causing the application generating the page to retrieve the table related to TR2 memory utilization in the current epoch from the server and display the table 918. In one embodiment, all field values are displayed overlaid on a bar that is the color corresponding to the class of the field: green, yellow, red or blue, so that exceptional data can be more easily located than if all data were presented in the same color.

Replay mode may be entered using buttons 922, some of which may be grayed out to indicate that their use is not available. As the buttons are used, the replay mode is entered and the date and time of day 920 corresponding to the fields being displayed is changed to reflect the epoch of the data being displayed. The buttons cause the epoch for the data being displayed to change relative to the epoch in effect when the button was pressed. A "set" button allows the epoch to be set to a specific time via a pop up window, not shown, and a "current" button changes the mode to real time. Other commands, such as the escape key to change the mode to real time, may be used.

In one embodiment, a user may enter an identifier of any of the clients for which data is displayed, and the data displayed is just for that single client, instead of displaying all clients that identify themselves as corresponding to a selected role or role set.

As described herein, data from clients that share the same role may be displayed with data from other clients that share that same role, even if the other clients use different platforms.

Operation of these pages may be performed by a lightweight program running on a display client accessing the server. The lightweight program may be an AJAX program running under a conventional browser. In one embodiment, response time is enhanced by providing only the top level table, with tables lower in the hierarchy being retrieved only as needed, as described herein.

System.
Overview.

Figure 10:
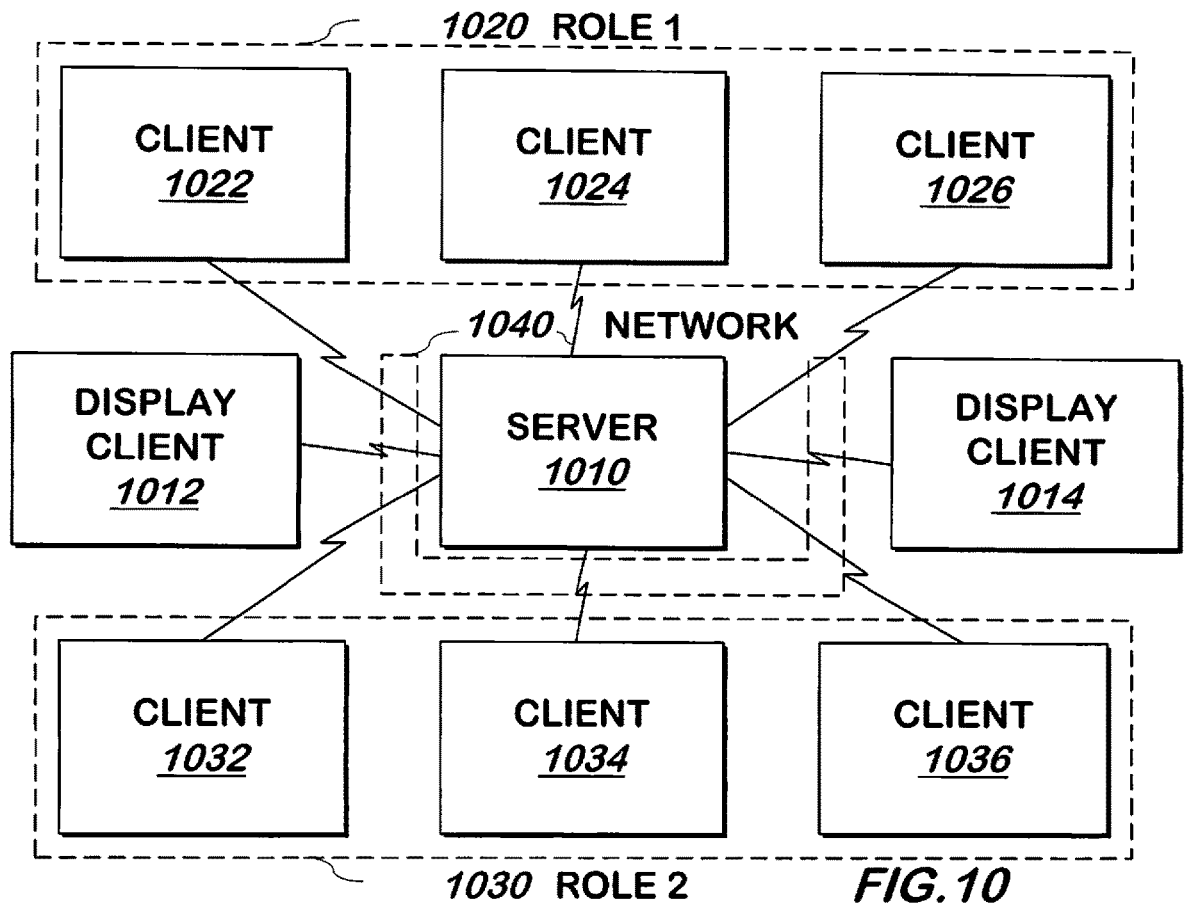
FIG. 10 is a block schematic diagram of a system containing a server, two display clients and six client computer systems according to one embodiment of the present invention.

FIG. 10 is a block schematic diagram of a system containing a server, two display clients and six clients according to one embodiment of the present invention. Other numbers of each of the elements of FIG. 10 may be used in other embodiments.

Referring now to FIG. 10, a system of a server 1010, two display clients 1012, 1014, and six clients 1022-1026 and 1032-1036 of two roles 1020, 1030 is shown according to one embodiment of the present invention. There may be more or fewer of any of these items in other embodiments. Server 1010 and clients 1022-1026 and 1032-1036 are computer systems coupled via network 1040 such as the Internet, an Ethernet or both, that operate as described herein. Display clients 1012, 1014, also connected via network 1040, include a conventional computer system running a conventional Java- or Javascript-compatible Browser or another programmable environment, such as ADOBE FLASH or another program executing capability. In one embodiment, only a browser is required, as much" of the intelligence can reside in the server 1010. If multiple servers are used, each may have access to a shared storage resource, such as a conventional database.

Figure 11:
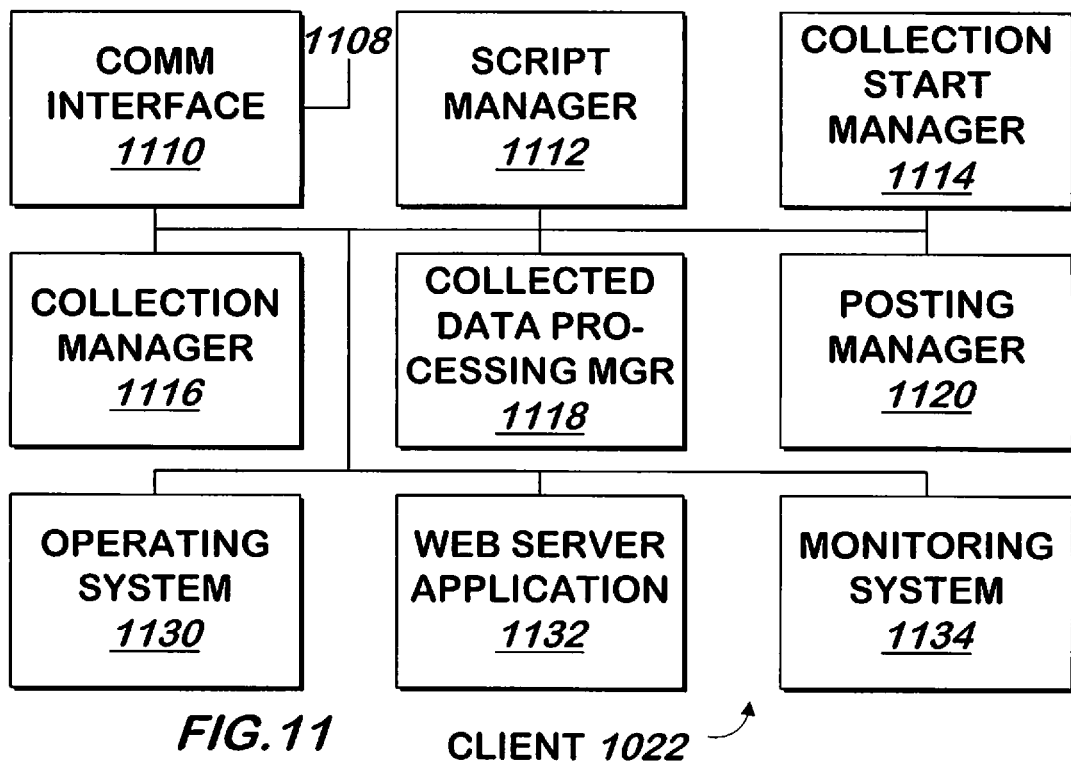
FIG. 11 is a block schematic diagram of a client of FIG. 10 according to one embodiment of the present invention.
Figure 12:
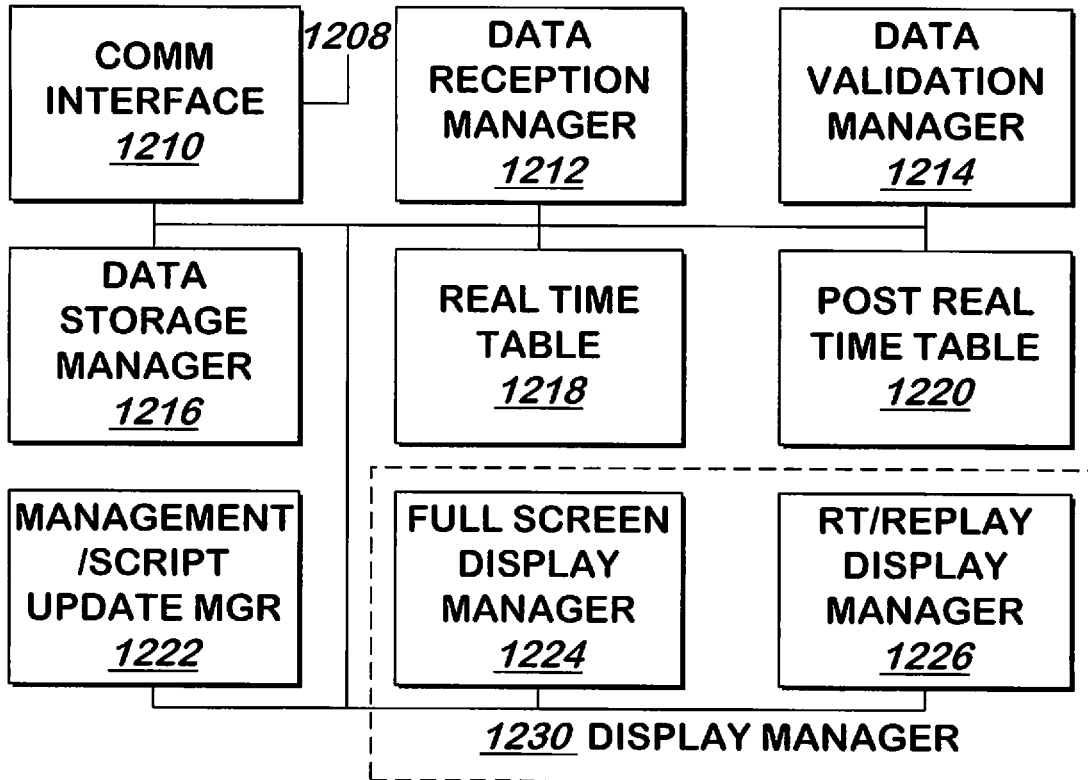
FIG. 12 is a block schematic diagram of a server of FIG. 10 according to one embodiment of the present invention.

Client 1022 is described in more detail in FIG. 11, and server 1010 is described in more detail in FIG. 12.

Client.

Referring now to FIG. 11, a representative client computer system 1022 of FIG. 10 is shown in more detail according to one embodiment of the present invention. Communication interface 1110 includes a conventional communication interface, such as a conventional Ethernet interface running conventional communications protocols, such as Ethernet, TCP/IP, and other conventional protocols. Communication interface 1110 communicates via input/output 1108, coupled to an Ethernet, the Internet, or both. In one embodiment, all communication into or out of client computer system (also referred to as a "client") is made via communication interface 1110.

Script manager 1112 handles the script operations including locating and executing the script as described above, including steps 210-222 of FIG. 2. Remotely retrieved scripts may be retrieved from server 1110 or from other conventional servers (not shown) and stored internally. Script manager 1112 may execute the script, including initializing variables and performing other housekeeping tasks, as described above. When script manager 1112 has located and started executing the script, script manager 1112 signals collection start manager 1114, which determines when to start as described above and sets a corresponding timer in operating system 1130, which is a conventional operating system, such as LINIX or WINDOWS. When the timer elapses, operating system 1130 signals collection manager 1116, which repeatedly, for example, at every epoch, collects status data as described above and in more detail below, and provides it to collected data processing manager 1118 for processing as described above and herein. One embodiment of collection manager 1116 is described in more detail below with reference to FIG. 13. One embodiment of collected data processing manager 1118 is described in more detail below with reference to FIG. 14. Collected data processing manager 1118 provides the processed data to posting manager 1120, which posts it to the server 1010 as described above and herein and receives the response. Posting manager 1120 provides the response to script manager 1112, which updates the script (which it internally stores) if so indicated by the response as described herein and above.

FIG. 13 is a block schematic diagram illustrating a collection manager of FIG. 11 in more detail according to one embodiment of the present invention. Referring now to FIG. 13, disk space manager 1310 obtains disk space data, for example, from operating system (not shown) as described above, and provides such information to collection output manager 1308, which internally stores such information. Memory manager 1312 obtains memory data, for example, from operating system, as described above and provides such information to collection output manager 1308, which internally stores such information. Process CPU manager 1314 obtains process CPU utilization, for example, from operating system, as described above and provides such information to collection output manager 1308, which internally stores such information.

Application manager 1316 identifies application data using one or more of the techniques as described above and provides such information to collection output manager 1308, which internally stores such data. Interprocess response time manager 1318 identifies interprocess response times from one or more processes as described above and provides such information to collection output manager 1308, which internally stores such information. Network status manager 1320 obtains network response time information as described above and provides such information to collection output manager 1308, which internally stores such information.

Web response times manager 1326 obtains one or more web response time information as described above and provides such information to collection output manager 1308, which internally stores such information. In one embodiment, web response times manager 1326 consists of interim web response time manager 1322, which measures interim web response times as described above and provides such information to collection output manager 1308, which internally stores such information, and web response time manager 1324 which measures the web response time, either the total time or the time after the interim web response time and until the web response is received as described above and provides such information to collection output manager 1308, which internally stores such information.

Collection output manager 1308 formats the information collected as described above and provides it via input/output 1306 as described above. In one embodiment, managers 1310-1324 perform the above functions when signaled by collection output manager 1308. Collection output manager 1308 receives the signal from collection manager 1116, via input/output 1306 and signals each manager 1310-1324, sequentially.

Referring again to FIG. 11, script manager 1112 waits for the start of each epoch (e.g. via an operating system timer) and initiates the repeat of the process described above.

Optional Web server application 1132 includes one or more conventional Web server applications. Monitoring system 1134 includes one or more conventional monitoring program that monitors the operation of web server application 1132, such as APACHE or WEBSPHERE, producing conventional outputs, which they internally store on storage components that include conventional memory or disk storage and are not separately shown.

FIG. 14 illustrates the collected data processing manager 1118 of FIG. 11 in more detail according to one embodiment of the present invention. Column manager 1410 selects each column to be processed using a list of columns in the script and identifies the name of the column, the data value (i.e. the field), and the class, using the data collected as described above and the script as described above, and provides it to descending table manager 1412.

If the received class is other than green, or unconditionally, as may be specified by the script, descending table manager 1412 identifies the descending table for the column it receives as described above. There may be multiple hierarchical levels of descending tables, and descending table manager 1412 identifies each such table. Descending table manager 1412 provides the information it receives and any descending tables to data title manager 1414.

Data title manager 1414 receives the information provided by descending table manager 1412, appends it to a data structure it maintains, for example in XML format, and signals column manager 1410, which initiates the selection and processing of the next column, or signals data title manager 1414 that there are no more columns, at which point data title manager 1414 adds to the data structure the epoch (which may be identified based on a time retrieved from the operating system 1130 and provided as part of the data collected, by any of the elements of FIG. 13), the client name or other identifier, and the platform and role names or other identifiers, and provides the data structure as described herein.

In one embodiment, the operation of elements 1114-1120 above are controlled by the script stored in script manager 1112. Each such element 1114-1120 reads the script and performs the functions described above and herein in accordance with the script. This allows the script to control the implementation-specific details of the data collection and processing. The sub elements of these elements described above may also operate according to the script.

Server.

Referring now to FIG. 12, a server 1010 is shown in more detail according to one embodiment of the present invention. Communication interface 1210 includes a conventional user interface similar or identical to communication interface 1110 described above. Communication interface 1210 communicates via input/output 1208, coupled to a conventional network such as an Ethernet, the Internet, or both. All communication into or out of server 1010 may be made via communication interface 1210. In one embodiment, communication to the user may be made via web pages provided as described herein.

Data reception manager 1212 receives status data and other associated data as provided by the clients as described above, such as client 1022 and provides it and the source IP address and port to data validation manager 1214, which validates it as described above, providing an error message to the source IP address and port of the data if the data is invalid. If the data is valid, data validation manager 1214 provides it to data storage manager 1216, which replaces the data from the same client in the real time table 1218 and appends it to the post real time table 1220 as described above. Each such table 1218, 1220 includes storage such as memory and/or disk storage and may include a conventional database.

If the data is validated, data validation manager 1214 provides the source IP address and port and the identifier of the platform and role of the client from which the data was received to management/script update manager 1222, which determines if the script for that platform and/or role should be updated as described above. If so, management/script update manager 1222 provides a response to the client from which the status data was received indicating that a new script should be retrieved and otherwise it sends a response indicating that a new script need not be retrieved. If the data is not valid, data validation manager 1214 sends an error message to the source IP address and port.

Management/script update manager 1222 receives such scripts via a user interface it provides that allows a user to provide or edit a script for a specified platform and/or role and indicate that that it should be retrieved at the next epoch. Management/script update manager 1222 internally stores the scripts and provides them in response to requests from each client, such as client 1122. The client 1122 provides its platform and role, which it internally stores, and script update manager 1222 provides the latest script for that platform and role. Management/script update manager 1222 also provides a user interface to allow other management functions described herein, such as customization of the real time and replay modes described herein.

Full screen display manager 1224 provides the status data received as described herein for display in the full screen mode as described herein. Full screen manager 1224 is described in more detail with reference to FIG. 15.

Real time/replay display manager 1226 provides the status data received as described herein in the real time modes and replay modes as described herein. Real time/replay display manager 1226 is described in more detail with reference to FIG. 16.

Full screen display manager 1224 and real time/replay display manager are part of display manager 1230.

Each of script update manager 1222, full screen display manager 1224 and real time/replay display manager 1226 provides a user interface that allows switching between the various modes they provide as described herein. The user interface may be links or commands that cause a request to be made from the display client 1012, 1014 that specifies the desired manager 1222-1226. Communication interface 1210 receives the request, provides it to the specified manager 1222-1226, which provides the information as described herein.

Full Screen Display Manager.

Full screen display manager 1224 is shown in more detail in FIG. 15. Referring now to FIG. 15, when the user sends a request to full screen display manager 1224 using a browser, full screen display manager 1224 receives the request, and in response provides a web page as described herein. To provide the web page, title header manager 1510 receives the request and provides title and/or header information, including the current epoch as described above and signals label/link manager 1512. Label/link manager 1512 selects the first role set of one or more roles and provides a label for the role set as a link as described above in the first column of the first row of a display area, and signals first exceptions manager 1514 with an indication of the current row and an identifier of the role set it selected. The link is a link to real time selection manager 1610, described in more detail below, and includes the role set identifier and/or roles in the role set. First exceptions manager 1514 identifies the number of classes corresponding to the first exception type, which in one embodiment is red, for the role set corresponding to the role set identifier it receives as described above. First exceptions manager 1514 provides a red bar and the number of exceptions it identified (e.g. number of red classes) in the column to the right of the label in the row corresponding to the indicator it receives if there is more than 0 of the number of classes it identified as described above. First exceptions manager 1514 provides the identifier of the role set and indicator of the row it received, and the number of exceptions it identified as described above to second exceptions manager 1516.

When it receives these items, second exceptions manager 1516 identifies the number of classes corresponding to a second exceptions type, which is in one embodiment, yellow classes, for the role set. If the number of such exceptions is greater than zero, second exceptions manager 1516 provides the number of exceptions and a yellow bar in the column to the right of the label if the number of exceptions it received from first exceptions manager 1514 was 0, or in the next column to the right of that column if the number of exceptions it received from first exceptions manager 1514 was greater than zero.

If the number of exceptions it identified and received was zero, second exceptions manager 1516 provides the indicator of the row to no exceptions manager 1518, which provides a green bar and the words "0 exceptions" to the right of the label in the row corresponding to the indication it received. Second exceptions manager 1518 signals to label/link manager 1512. If the number of exceptions it identified and received was zero, second exceptions manager 1516 signals label/link manager 1512.

When it receives the signal, label/link manager 1512 selects the next role set, displays the label as a link in the row after the row it selected, and repeats the process described above using that role set and that row, until there are no more role sets.

In one embodiment, title/header manager 1510 installs a Javascript or other program with the display it provides that causes the user's browser to wait until the next epoch, and send a request to title/header manager 1510 to repeat the process described above, causing the redisplay of all of the information, updated for the current epoch.

Real Time/Replay Display Manager.

Figure 16:
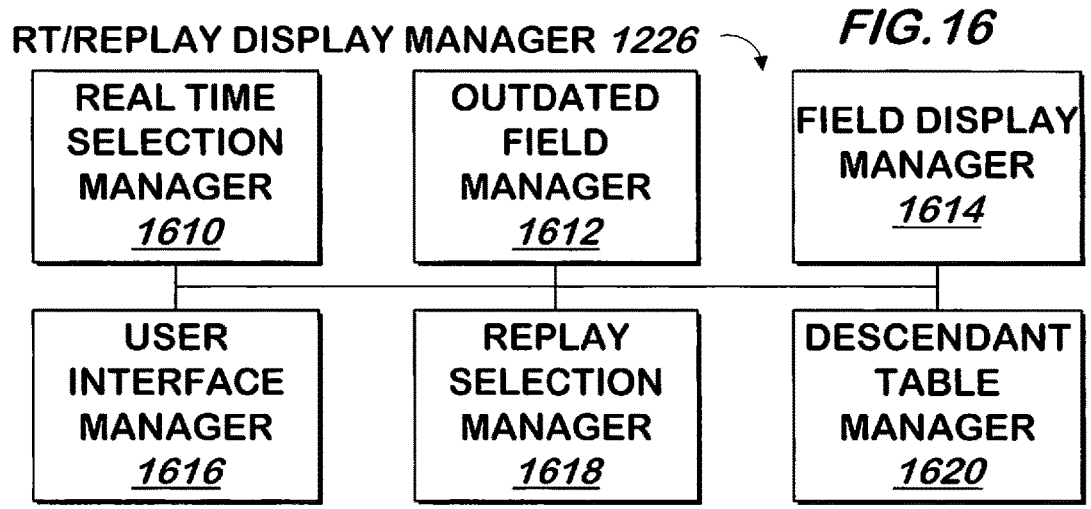
FIG. 16 is a block schematic diagram illustrating a real time/replay display manager of FIG. 12 in more detail according to one embodiment of the present invention.

FIG. 16 is a block schematic diagram illustrating a real time/replay display manager 1226 of FIG. 12 in more detail according to one embodiment of the present invention. Referring now to FIG. 16, user interface manager 1616 receives the identifier of the role or roles in the role set to display from the user's browser in display client 1014 when a user clicks a role set name on the full screen display as described above.

In one embodiment, label/link manager 1512 of full screen display manager 1224 provides a user interface to each user to allow the user to define which one or more roles should be displayed by real time/replay display manager 1226 when a user clicks a role set name displayed by full screen display manager 1224 as described above. Label/link manager 1512 of full screen display manager 1224 internally stores for each user the displayed role set name and the names of the roles that should be displayed by real time/replay display manager 1226 and provides links with the role names that should be displayed by real time/replay display manager 1226 when full screen display manager 1224 displays the role set names as described above. The links are links to real time/replay display manager 1226 that include the role names of the roles real time/replay display manager 1226 will display. In one embodiment, such configuration may be implemented by a system administrator to implement a default set of roles that correspond to each role set, as well as by individual users, who can modify the defaults to suit their tastes by adding or removing roles from role sets, defining new role sets or deleting role sets.

User interface manager 1616 provides the header of a web page and user interface controls to control the epoch for which the user wishes to see data. The default may be the immediately preceding epoch. Other controls such as a button with a link to request the full screen display from full screen display manager 1224 and a text box to change the displayed role set name may be provided. In one embodiment, the text box may be a drop down list of role set names that user interface manager 1616 retrieves from real time table 1218, post real time table 1220 or both. If no epoch is selected using such controls, user interface manager 1616 provides the role name or names it receives to real time selection manager 1610.

When it receives the names, real time selection manager 1610 waits for the next epoch to pass and then identifies the recently passed epoch as the current epoch to display, selects the first role of the role names it receives, identifies a display coordinate of the upper left hand corner of a table into which the selected role will be displayed, displays the selected role and epoch as a table heading, selects the first client of the selected role and initializes a client counter to 0, and selects the first column in the real time table in real time table 1218, initializes a column counter to 0, and identifies if the data for the column is up to date as described above. If it is not up to date, real time selection manager 1610 provides the out of date data, the identified display coordinate, and the client counter and column counter to outdated field manager 1612. If it is up to date, real time selection manager 1610 provides the data, the identified display coordinate, and the client counter and column counter to field display manager 1614.

When the data, the identified display coordinate, and the client counter and column counter are received by field display manager 1614 or outdated field manager 1612, field display manager 1614 or outdated field manager 1612 provide for display the data in a table according to the display coordinate of the table, and the client counter and column counter as described above. Field display manager 1614 provides the data using a normal font, but outdated field manager 1612 provides the data using a strikethrough font or other manner that is different from the manner used by field display manager 1614 to indicate that the data is out of date. In one embodiment, all information provided by real time/replay display manager 1226 is provided as part of a web page that will be rendered and displayed by a display client 1012, 1014 using a conventional browser.

Real time selection manager 1610 selects the next column (if such a column exists), or selects the first column and the next client if such a client exists, changes the row counter, and optionally, the client counter in accordance with such selection, and then repeats the process described above to cause the data to be provided for display by field display manager 1614 or outdated field manager 1612.

In one embodiment, if there are no more clients of those received as described above, real time selection manager 1610 selects the next role from those received and repeats the process described above. In this manner, multiple columns of multiple clients from one or more roles are provided for display and displayed by a display client 1012, 1014 as described herein. When all roles have been displayed in this manner, real time selection manager 1610 provides end of web page delimiters for display.

In one embodiment, outdated field manager 1612 and field display manager 1614 provide the data with a javascript script (or other AJAX or other method) that displays a pop up window on mouseover as described above. The pop up window requests the data from descendant table manager 1620, which retrieves the data from post real time table 1220 and either formats it as described above and provides it for display or provides it to the script, which formats it and displays it using the browser (not shown) of the display client.

In one embodiment, as part of the information it provides, real time selection manager 1610 provides a Javascript program that causes the user's browser to wait for the next epoch to pass and then provide the role names to user interface manager 1616, which repeats the process described above, causing the data from the most recently completed epoch to be automatically displayed.

If the user clicks on a control to change the epoch as described above, the control causes the user's browser to provide the names of the role or roles in the role set and the change in epoch requested to user interface manager 1616. In response, user interface manager 1616 redisplays the controls and the header of the web page as described above.

User interface manager 1616 retrieves the current time from a system clock (not shown) and uses the change in epoch and current time to identify the desired epoch, and provides the desired epoch and role name or names it received to replay selection manager 1618.

When replay selection manager 1618 receives the epoch and role name or names, it selects the first role, identifies a display coordinate of the upper left hand corner of a table into which the selected role will be displayed, displays the selected role and the received epoch as a table heading, selects the first client of the selected role and initializes a client counter to 0, and selects the first column for epoch it receives in the real time table in post real time table 1220, initializes a column counter to 0, and identifies if the data for the column was up to date as of the time of that epoch as described above. If it was not up to date as of the epoch being displayed, replay selection manager 1618 provides the out of date data, the identified display coordinate, and the client counter and column counter to outdated field manager 1612. If it is up to date, real time selection manager 1610 provides the data, the identified display coordinate, and the client counter and column counter to field display manager 1614. Outdated field manager 1612 and/or field display manager 1614 display the data as described above.

Replay selection manager 1618 selects the next column (if such a column exists), or selects the first column and the next client if such a client exists, changes the row counter, and optionally, the client counter in accordance with such selection, and then repeats the process described above to cause the data to be provided for display by field display manager 1614 or outdated field manager 1612.

In one embodiment, if there are no more clients of those received as described above, replay selection manager 1618 selects the next role from those received and repeats the process described above. In this manner, multiple columns of multiple clients from one or more roles are provided for display and displayed by a display client 1012, 1014 as described herein. When all roles have been displayed in this manner, replay selection manager 1618 provides end of web page delimiters for display.

The user may then use the controls provided by user interface manager 1616 to change the epoch as described above, to return the display to the current epoch or to display in full screen display mode as described above. If the user uses such controls to cause the current epoch to be displayed, the control contains a link to user interface manager 1616 that indicates that the current epoch display has been requested and the role name or names. User interface manager 1616 then initiates the display of the data for the current epoch for the role name or names as described above. If the user uses the control to cause the full screen mode to be displayed, the link associated with the control causes the user's browser to send a request to full screen display manager 1224 as described above.

Display of Data.

In one embodiment, the display of the data as described herein is performed by rendering data for display on a display screen as described herein and then providing it to an interface capable of rendering to the screen used. In one embodiment, the display screen is a conventional display screen. In one embodiment, the display screen contains a tangible computer storage subsystem, such as memory or disk, into which a data structure corresponding to the display screen is stored when it is received by the display screen. The display screen receives the rendered data, transforms the memory in the display screen and uses the transformed data in the memory to display the pixels on the display screen. Each element providing data for display may use its own data structure stored in tangible memory or disk as a staging area to buffer at least some of the data for display before sending it to the display screen. As the data is rendered, the data structure in the tangible storage is altered.

What is claimed is:

1. A method of displaying data about physical conditions of a plurality of computer systems, the method comprising:
   executing, by respective ones of the plurality of computer systems, a first script stored on the respective ones of the plurality of computer systems, the first script instructing the respective ones of the plurality of computer systems to collect the data about the physical conditions and to transmit the data and one or more of a platform and a role assigned to the respective ones of the plurality of computer systems to a server;
   receiving, by the respective ones of the plurality of computer systems, an indication that the first script is obsolete;
   retrieving, by the respective ones of the plurality of computer systems, one of a plurality of second scripts from the server from the server based on the one or more of the platform and the role assigned to the respective ones of the plurality of computer systems;
   executing, by the respective ones of the plurality of computer systems, the retrieved second script, the retrieved second script instructing the respective ones of the plurality of computer systems to collect the data about the physical conditions and to transmit the data and the one or more of the platform and the role assigned to the respective ones of the plurality of computer systems to the server by,
      identifying, by the respective ones of the plurality of computer systems, a plurality of first measures of conditions of processor and/or storage and/or network resources of said computer system available to, or in use by, said computer system, at least one of the plurality of first measures identified by measuring a web response time of external services provided to the said computer system by transmitting a request from said computer system to the external services and recording two different times of a portion, but not all, of a web response from the external services to the request, and calculating a difference between the two different times recorded;
      measuring, by the respective ones of the plurality of computer systems, at least one second measure of at least one response time specific to an application running on said computer system measuring the portion of said web response; and
      communicating, by the respective ones of the plurality of computer systems, the plurality of first measures from said computer system and communicating the at least one second measure for said computer system to the server via a network along with the one or more of the platform and the role assigned to the respective ones of the plurality of computer systems such that the second measure of the at least one response time indicates the response time of the said computer system itself while the at least one of the plurality of first measures indicates the response time of the external services provided to said computer system,
   wherein the server is configured to aggregate and consolidate the plurality of first measures and the at least one second measure and display such aggregated and consolidated plurality of first measures and at least one second measure.

2. The method of claim 1, wherein at least one of the plurality of first measures comprises at least one of a measure of disk space of the computer system used and a measure of memory of the computer system in use.

3. The method of claim 1, wherein at least one of the plurality of first measures comprises a measure of interprocess response time.

4. The method of claim 1, wherein the second measure is obtained and communicated to the server by a second computer system, different from the computer systems in the plurality.

5. The method of claim 1, wherein at least one of the plurality of first measures comprises a measure of network status.

6. The method of claim 1, wherein at least one of the plurality of first measures comprises a measure of the web response time.

7. A system for displaying data about physical conditions of a plurality of computer systems, the system comprising:
   the plurality of computer systems each including client-side processing circuitry for,
      executing a first script stored on the computer system, the first script instructing the computer system to collect the data about the physical conditions and to transmit the data and one or more of a platform and a role assigned to the computer system to a server,
      receiving an indication that the first script is obsolete,
      retrieving one of a plurality of second scripts from the server from the server based on the one or more of the platform and the role assigned to the computer system;
      executing the retrieved second script, the retrieved second script instructing the computer system to collect the data about the physical conditions and to transmit the data and the one or more of the platform and the role assigned to the computer system to the server by,
         identifying a plurality of first measures of conditions of processor and/or storage and/or network resources of said computer system available to, or in use by, said computer system, at least one of the plurality of first measures identified by determining a web response time of external services provided to the said computer system by transmitting a request from said computer system to the external services and recording two different times of a portion, but not all, of a web response from the external services to the request, and calculating a difference between the two different times recorded,
         measuring at least one second measure of at least one response time specific to an application running on said computer system measuring the portion of the web response, and
         communicating the plurality of first measures from said computer system and the at least one second measure for said computer system to the server via a network along with the one or more of the platform and the role assigned to the computer system such that the second measure of the at least one response time indicates the response time of the said computer system itself while the at least one of the plurality of first measures indicates the response time of the external services provided to said computer system; and
   the server including server-side processing circuitry for aggregating and consolidating the plurality of first measures and the at least one second measure and displaying the aggregated and consolidated plurality of first measures and at least one second measure.

8. The system of claim 7, wherein:
at least one of the plurality of first measures comprises at least one of a measure of disk space of the computer system used and a measure of memory of the computer system in use.

9. The system of claim 7, wherein:
at least one of the plurality of first measures comprises a measure of interprocess response time.

10. The system of claim 7, wherein:
at least one of the plurality of first measures comprises a measure of network status.

11. The system of claim 7, wherein:
at least one of the plurality of first measures comprises a measure of the web response time.

12. The system of claim 7 wherein the second measure is obtained and communicated to the server by a second computer system, different from the computer systems in the plurality.

13. A non-transitory computer readable medium having computer readable program code embodied therein configured to cause a computer system to display data about physical conditions of a plurality of computer systems by:
executing, by respective ones of the plurality of computer systems, a first script stored on the respective ones of the plurality of computer systems, the first script instructing the respective ones of the plurality of computer systems to collect the data about the physical conditions and to transmit the data and one or more of a platform and a role assigned to the respective ones of the plurality of computer systems to a server;
receiving, by the respective ones of the plurality of computer systems, an indication that the first script is obsolete;
retrieving, by the respective ones of the plurality of computer systems, one of a plurality of second scripts from the server from the server based on the one or more of the platform and the role assigned to the respective ones of the plurality of computer systems;
executing, by the respective ones of the plurality of computer systems, the retrieved second script, the retrieved second script instructing the respective ones of the plurality of computer systems to collect the data about the physical conditions and to transmit the data and the one or more of the platform and the role assigned to the respective ones of the plurality of computer systems to the server by,
identifying, by the respective ones of the plurality of computer systems, a plurality of first measures of conditions of processor and/or storage and/or network resources of said computer system available to, or in use by, said computer system, at least one of the plurality of first measures identified by determining a web response time of external services provided to the said computer system by transmitting a request from said computer system to the external services and recording two different times of a portion, but not all, of a web response from the external services to the request, and calculating a difference between the two different times recorded;
measuring, by the respective ones of the plurality of computer systems, at least one second measure of at least one response time specific to an application running on said computer system measuring the portion of said web response time; and
communicating, by the respective ones of the plurality of computer systems, the plurality of first measures from said computer system and communicating the at least one second measure for said computer system to the server via a network along with the one or more of the platform and the role assigned to the respective ones of the plurality of computer systems such that the second measure of the at least one response time indicates the response time of the said computer system itself while the at least one of the plurality of first measures indicates the response time of the external services provided to said computer system,
wherein the server is configured to aggregate and consolidate the plurality of first measures and the at least one second measure from the plurality of computer systems, and display such aggregated and consolidated plurality of first measures and at least one second measure.

14. The non-transitory computer readable medium of claim 13, wherein at least one of the plurality of first measures comprises at least one of a measure of disk space of the computer system used and a measure of memory of the computer system in use.

15. The non-transitory computer readable medium of claim 13, wherein at least one of the plurality of first measures comprises a measure of interprocess response time.

16. The non-transitory computer readable medium of claim 13, wherein at least one of the plurality of first measures comprises a measure of network status.

17. The non-transitory computer readable medium of claim 13, wherein at least one of the plurality of first measures a measure of the web response time.

18. The non-transitory computer readable medium of claim 13, wherein the second measure is obtained and communicated to the server by a second computer system, different from the computer systems in the plurality.

\* \* \* \* \*